May 3, 1927. 1,626,739
J. M. LENTS ET AL
METHOD AND APPARATUS FOR FIRE FINISHING GLASS ARTICLES
Filed March 26, 1924 3 Sheets-Sheet 1
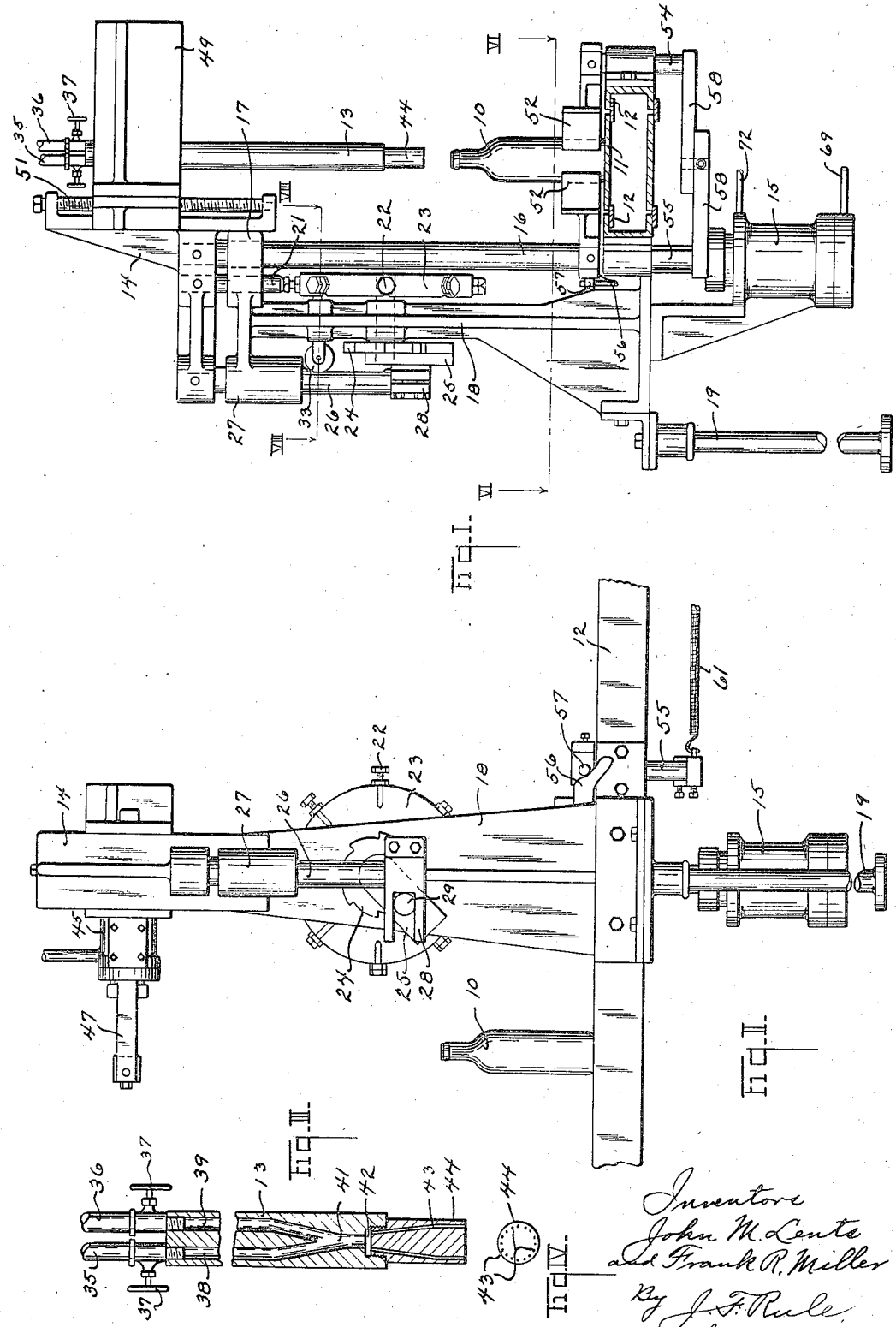

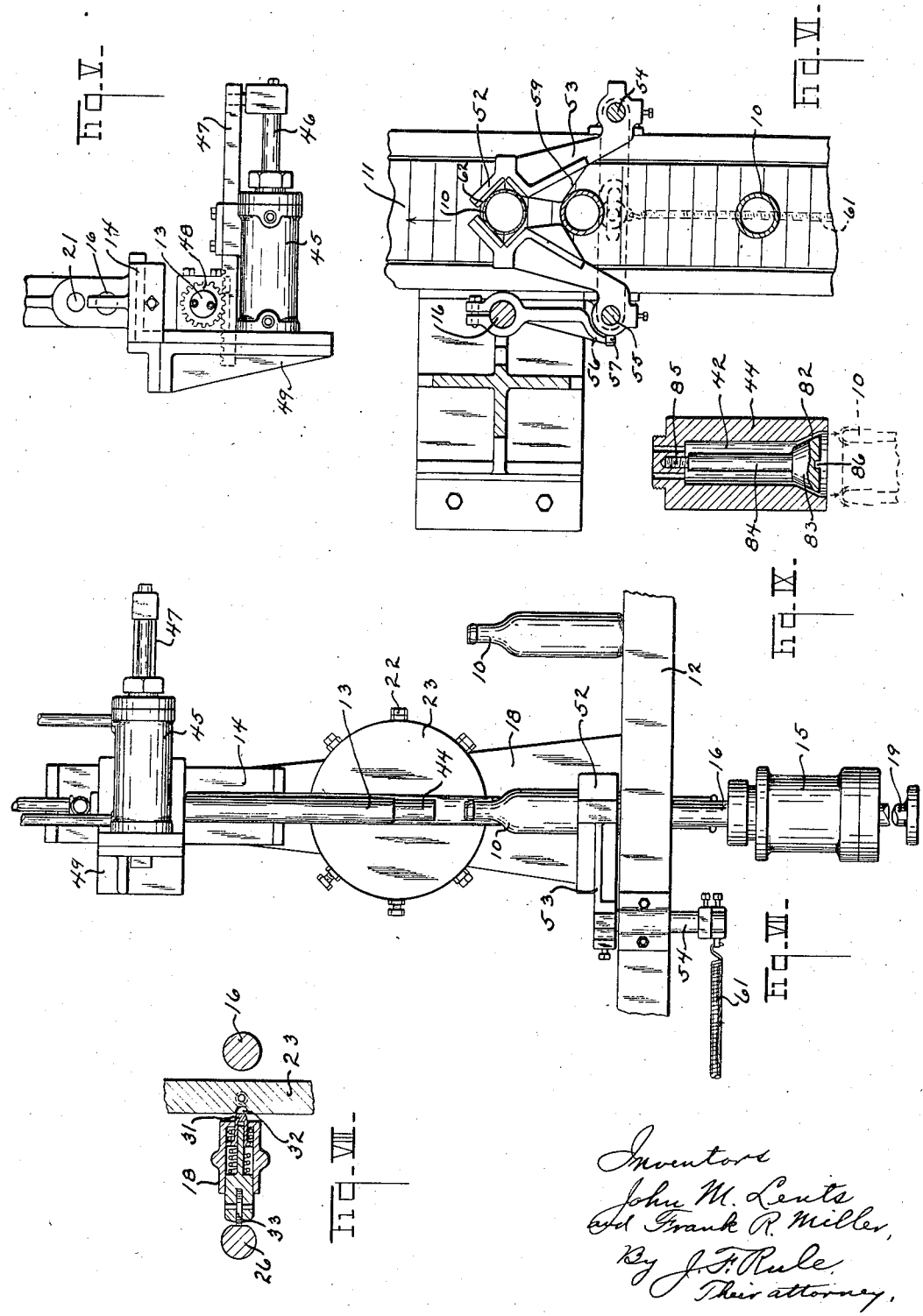

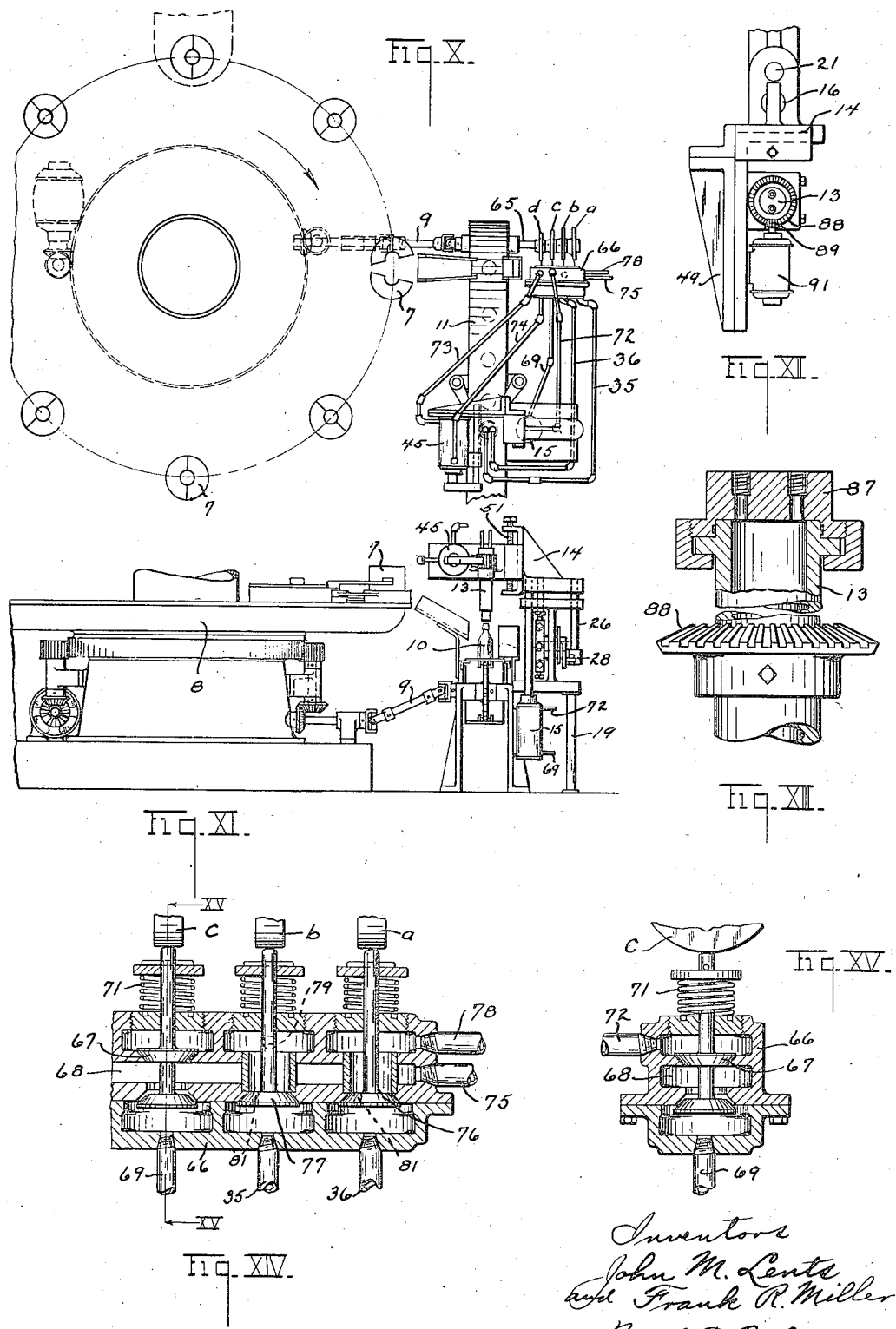

Patented May 3, 1927.

1,626,739

UNITED STATES PATENT OFFICE.

JOHN MURL LENTS AND FRANK R. MILLER, OF EVANSVILLE, INDIANA, ASSIGNORS TO GRAHAM GLASS COMPANY, OF EVANSVILLE, INDIANA, A CORPORATION OF INDIANA.

METHOD AND APPARATUS FOR FIRE-FINISHING GLASS ARTICLES.

Application filed March 26, 1924. Serial No. 701,953.

Our invention relates to a novel method of fire finishing glass articles, and to apparatus particularly adapted for use in practicing such method. The method is of special value for finishing the upper ends or lips of bottles or other glass containers and the like, and the apparatus herein disclosed is specifically designed for such purpose, but it is to be understood that the invention is not limited to such method and apparatus, and may also be used for other purposes.

An object of the invention is to provide an improved method and means for fire finishing the neck ends of machine-made bottles or other glass containers. In the manufacture of such bottles, the blank or charge of glass is ordinarily introduced into a body blank mold and sectional neck mold arranged in juxtaposition. A plunger tip or core projecting into the neck mold, forms an initial blow opening in the blank. The glass is forced into the neck mold around the core and thereby forms the neck of the bottle, after which the blank is transferred to a finishing mold, the neck mold opened, and the bottle blown to finished form.

In the above method of forming the bottles, there is ordinarily produced a rather sharp annular edge or corner at or near the inner edge of the bottle lip, where the neck mold and core meet. Small ridges or seams are also formed on the bottle lip where the neck mold sections meet. These become more pronounced as the mold wears. There is also a tendency for the lip of the bottle to check or crack, owing to the method of forming the neck and the excessive cooling of the neck end of the bottle in the mold.

The above and other minor defects which develop during the fabrication of the bottle, interfere with or prevent perfect sealing. Further, in filling the bottles when used for beverages, etc., the metal filling tube which enters the bottle neck, frequently chips off small pieces of glass, owing to the sharp edges, fins or roughness of the bottle top. These particles of glass are carried into the bottle and mixed with the contents intended for human consumption, which is obviously a serious objection.

An object of the present invention is to provide an efficient method and means for overcoming the above objections by removing the defects in the bottle finish and producing a smooth, well finished bottle top, free from sharp edges, fins, cracks or other roughness. In the attainment of this object, an intensely hot, localized flame is applied for a brief interval on the surface to be finished. The heat is of such intensity that the surface of the glass is softened and melted almost instantly, sharp edges and projections melted away, sharp corners rounded, checks or cracks filled in and a smooth finished surface produced. This surfacing takes place before the heat has had time to penetrate and soften the walls of glass to such an extent that they will not hold their shape. The present method of fire finishing is in this respect entirely distinct from and in marked contrast to the ordinary fire finishing method heretofore in extensive use, which consists in applying a flame which heats and softens the entire body of glass within the fire finishing area before the surface is softened sufficiently to take a fire finish. With this old method, the heating was gradual and operated to increase and open up the checks or cracks rather than to smooth them over and close them up with melted glass. In the method comprised in the present invention, the heat of the flame is much more intense, is localized, and acts much more quickly to melt and glaze the surface of glass being acted upon. Further, with the old method, the heating was so gradual and extended through such an area that the entire top of the bottle was softened to such an extent that it would not hold its shape, but was more or less distorted by the time the surface was heated sufficiently to produce the fire finish. In the present method, the heating is so intense and the heating takes place so quickly that it is practically confined to the outer surface of the bottle lip or finish.

A further practical feature of the present method of fire finishing is that it enables a uniform height of the bottles to be much more accurately maintained than with the old method in which the heating and softening of a considerable part of the bottle tended to produce variations in length of the bottle. With the modern development of bottling machinery, the bottlers are demanding great accuracy and uniformity in the height of the bottles, in some instances complaining of variations of 1/64th of an inch.

Further features of the invention relate to the means for supplying the heating flame, timing mechanism for bringing the bottles or other articles successively into operative relation to the fire finisher at regular intervals and holding them in operative position, means for causing a relative rotation of the burner and bottles during the fire finishing, and means to periodically vary the position of the burner to correspond to articles of different lengths or dimensions which are brought to fire finishing position in a predetermined order.

Other objects of the invention will appear hereinafter.

In the accompanying drawings:

Figure 1 is a part sectional side elevation of an apparatus for fire finishing bottles and the like in accordance with the principles of our invention.

Figure 2 is a front elevation of such apparatus.

Figure 3 is a longitudinal sectional view of the burner.

Figure 4 is an end view of the burner.

Figure 5 is a top plan view showing mechanism for oscillating the burner.

Figure 6 is a sectional plan at the line VI—VI on Figure 1.

Figure 7 is an elevation viewed in the opposite direction from that of Figure 2.

Figure 8 is a section at the line VIII—VIII on Figure 1.

Figure 9 is a sectional view of a modified form of burner nozzle.

Figure 10 is a diagrammatic plan view of the bottle blowing machine and fire finishing apparatus.

Figure 11 is an elevation of the same.

Figure 12 is a plan view showing a continuously rotating burner and a motor for driving the same.

Figure 13 is an enlarged part sectional elevation of the continuously rotating burner, parts being broken away.

Figure 14 is a sectional elevation of a valve box and valves therein.

Figure 15 is a section at the plane of the line XV—XV on Figure 14.

The bottles 10 or other articles to be fire finished, are automatically brought into cooperative relation to the fire finishing burner on an endless conveyor 11 which travels continuously on a horizontal conveyor frame 12. The conveyor has driving connections 9 (Fig. 10) with the rotating mold carriage of the bottle blowing machine 8. The bottles 10 as they are discharged from the molds 7 of the bottle blowing machine, are automatically placed in upright position on the belt 11 and brought in succession to the fire finishing position directly beneath a burner 13. The burner is carried on a frame 14 which is periodically reciprocated vertically by means of an air motor 15 having a piston rod 16 attached at its upper end to the frame 14. The rod 16 is guided in a bearing 17 formed in the head of a stationary frame 18 supported on standards 19. The downward movement of the frame 14 is limited by a stop rod 21 on the frame 14, said rod coming in contact with one of the stops 22 on a stop wheel 23. The wheel 23 is provided with a number of stops 22 preferably equal to the number of finishing molds on the bottle blowing machine 8.

The stop wheel is given a step-by-step rotation to bring the stops 22 successively to a vertical position beneath the stop rod 21. The means for imparting a step-by-step movement to the stop wheel comprises a ratchet wheel 24 actuated by a dog on an arm 25 connected to the wheel shaft. A rod 26 is secured to the head of the frame 14 and extends vertically downward through a bearing sleeve 27 in the stationary frame 18. Said rod carries a yoke 28 engaging a stud 29 on the arm 25 for reciprocating said arm. It will be seen that with this construction, the stop wheel is advanced one step each time the frame 14 is lifted, thereby bringing the next stop 22 into position to arrest the frame 14 in its downward movement. The fire finishing operation takes place while the frame is in its lowered position in which it is supported on a stop 22. Each of the stops 22 has a screw threaded stem by which the stop is adjustable, and the stops are so adjusted that the burner 13 is held at the proper distance above the bottle 10 during the fire finishing operation.

It will be noted that by having the number of stops 22 correspond to the number of finishing molds 7 on the machine, each individual stop will cooperate with the bottles 10 delivered by the particular mold corresponding to such stop. In practice, the molds on the glass blowing machine are removable and may be replaced by other molds of different shapes or lengths. The machines are frequently run with molds of different lengths on the machine for simultaneously making bottles of different lengths. The present invention provides a means whereby the burner 13 is automatically positioned at the proper height for each individual bottle, it being only necessary to effect a preliminary adjustment of the stops 22 to positions corresponding to the lengths of the molds then in use. The throw of the stop wheel 23 is controlled by a spring detent 31 (Fig. 8) which engages notches 32 in the wheel spaced to correspond with the spacing of the stops 22. The detent is mounted in the stationary frame 18 and carries a roll 33 bearing on the rod 26, which may be formed to move the detent toward the stop wheel as a notch 32 is brought opposite the detent.

The fuel gases, preferably oxygen and acetylene, are supplied to the burner through pipes 35 and 36 respectively (see Fig. 3). The supply is regulated by hand valves 37. The pipes 35 and 36 communicate with passageways 38 and 39 in the burner which unite in a common passageway 41 terminating in a mixing chamber 42. The mixed gases pass from the chamber 42 through an annular series of passageways 43 in the removable nozzle 44 of the burner. The mixture of oxygen and acetylene gas burns as it issues from the minute openings 43 in fine jets, producing an intensely hot flame. The gas issues with considerable pressure and the openings 43 are close enough together to produce substantially a ring of flame which is directed against the upper end or lip of the bottle, the ring or cylindrical sheet of flame corresponding in diameter to the diameter of the bottle lip.

The heat of this flame is so intense that it quickly melts the surface of the glass to which it is applied, and instantaneously melts down the rough edges or seams, filling up any checks or cracks in the surface of the glass and producing a smooth finish which quickly hardens when the flame is cut off, producing a hard, smooth glaze. The intensity of the flame is such that the surface of the glass is liquefied before the heat has had time to penetrate into the body of the glass sufficiently to soften it and cause it to lose its shape or sag down under its own weight.

At the same time, there is a certain amount of reheating of the neck of the bottle in addition to the localized heat applied directly to the lip or surface which is being fire finished. That is to say, in addition to the direct application of the sharply defined, concentrated jets of flame against the end of the bottle, there is a certain amount of diffused flame which surrounds and enters the bottle neck. This is due in part to the fact that the burning jets as they impinge on the lip of the bottle, are thereby spread, part entering the bottle neck and part surrounding and enveloping the neck.

This heat zone, enveloping the upper end of the bottle, causes a reheating of the bottle neck which counteracts the effect of the greater amount of chilling to which this portion of the bottle is subjected in the molds. As a result, a more perfect annealing of the bottle is secured. It is found in practice that when bottles are subjected to this fire finishing process, the neck ends thereof are much stronger and tougher and much less liable to breakage than bottles that have not received this heat treatment. This is apparently due to the more perfect and uniform annealing. It will be understood that the bottles when they reach the fire finisher are still quite hot, as they have only been out of the blowing molds for a short time.

Although we prefer the use of the oxy-acetylene flame with this burner, as it gives highly satisfactory results in practice, it will be understood that any other fuel gases giving a sufficiently intense flame might be used.

The ring of openings 43 in the burner nozzle gives an approximately annular sheet of flame if the openings are close enough together, so that there is an approximately uniform distribution of the heat at the surface which is being fire finished. We have found, however, that there is a substantial advantage in effecting a relative rotation of the nozzle and bottle during the fire finishing, either by rotating the bottle or by rotating the nozzle. When there is such a relative rotation, the openings 43 in the nozzle may be spaced much farther apart and still obtain a practically uniform distribution of the directly applied flame which is in effect a continuous ring of flame. By thus reducing the number of openings 43, the amount of fuel required is correspondingly reduced. Moreover, by such rotation, the tendency of the individual jets of flame to burn holes or depressions in the glass, is entirely overcome. This tendency, when the rotation is omitted, is due to the force with which the jets of flame strike the surface of the glass, and also to the unequal distribution of the heat over such surface.

Rotation of the burner relative to the bottle may be effected by an air motor 45 having a piston rod 46 connected to a rack bar 47 having rack teeth in mesh with a pinion 48 on the burner 13. The motor 45 is mounted on a bracket 49 carried on the frame 14 and adjustable up and down thereon by means of a screw rod 51. The burner 13 is carried with said motor and adjustable up and down therewith. Air is supplied (as hereinafter set forth) to the motor 45 for reciprocating the rack 47 and thereby oscillating the burner while the latter is in operative relation to a bottle, as shown in Figure 1.

Fuel gas is preferably supplied to the burner intermittently. That is, the flame is automatically cut off or reduced, except while the bottle is in position for fire finishing. Ordinarily the flame is required only for a fraction of the time the bottle is in such position, as the intensity of the flame is such that the fire finishing operation is very quickly effected. The motor 45 for rotating the burner and the motor 15 for reciprocating the burner vertically, are automatically operated in timed relation and in synchronism with the operation of the bottle blowing machine which supplies the bottles, suitable timing mechanism being provided to effect such synchronized operations of the air motors.

The timing mechanism comprises a series of cams $a$, $b$, $c$, $d$, (Fig. 10) on a continuously rotating shaft 65 operated from the drive shaft 9. The cams actuate valves in a valve box 66 (see Figs. 14 and 15). The cam $c$ engages the stem of a valve 67 which controls the supply of air to the motor 15. When the valve is lowered, air under pressure is supplied from a pressure chamber 68 through a pipe 69 to the lower end of the motor. When the valve is lifted, the supply of air is cut off from the pipe 69 and supplied through a pipe 72 to the upper end of the motor. The valve stem is held against its cam by a spring 71. The cam $d$ in like manner controls the supply of air from the pressure chamber 68 through pipes 73 and 74 to the motor 45 for rotating the burner. Air pressure is continually maintained in the chamber 68 by air supplied from any suitable source through a pipe 75 leading to said chamber.

The cams $a$ and $b$ respectively actuate valves 76 and 77 which control the supply of acetylene gas and oxygen to the burner. The acetylene gas enters the valve chamber above the valve 76 through a pipe 78. When the valve 76 is lowered, the gas is supplied through the pipe 36 to the burner. Oxygen is admitted in like manner through a pipe 79 to the valve chamber above the valve 77 so that when the latter is lowered, oxygen is admitted to the pipe 35 leading to the burner. The valves 76 and 77 may be provided with restricted openings 81 therethrough, so that the supply of gases to the burner is never entirely cut off, but a small pilot flame maintained between fire finishing operations.

The mechanism for holding the bottles in fire finishing position will now be described. Such mechanism comprises a pair of gripping jaws 52 formed on the outer ends of arms 53 keyed to vertical rock shafts 54 and 55 journalled in the stationary conveyor frame 12. The arms 53 are periodically rocked to open the jaws, by means of a cam 56 (Figs. 1 and 2) which may be carried on the piston rod 16. As the piston rod moves upward, the cam 56 engages a pin or detent 57 projecting from the shaft 55, and rocks the latter. A rocking movement is at the same time imparted to the shaft 54 through a pair of toggle links 58 connecting said shafts. The gripping jaws are thus opened to permit the bottle 10 which has just been fire finished to be carried by the traveling conveyor 11 beyond the jaws. At the same time, the next succeeding bottle which in the meantime has been arrested by stop surfaces 59 on the arms 53,—is permitted to advance to fire finishing position, in which position it is arrested by the clamping jaws 52 which now grip it. Said jaws are moved to bottle gripping position by a coil spring 61 attached to toggle links. The jaws 52 are preferably lined with asbestos 62 and the stop surfaces 59 may also be formed of asbestos. The mechanism just described serves not only as a means for holding the bottles stationary and in position during the fire finishing, but also as a timing device. The bottles as delivered to the conveyor 11 are not always uniformly spaced thereon and the stop surfaces 59, therefore, provide a means by which a bottle is always in the right position to be advanced and engaged by the gripping jaws when the latter operate, regardless of irregularities in the spacing of the bottles before reaching the fire finisher.

Figure 9 illustrates a modified form of burner nozzle provided with an annular outlet orifice 82 instead of a series of individual openings as shown in Figure 4. This annular orifice or passageway is provided by means of an adjustable member comprising a frusto-conical head 83. The stem 84 of said member has a screw threaded connection 85 with the nozzle. A kerf 86 permits said member to be adjusted with an ordinary screw driver to adjust the size of the outlet. This construction permits an evenly distributed annular sheet of flame to be directed against the lip of the bottle without the necessity of providing a relative rotation between the burner and bottle.

Figures 12 and 13 illustrate a modification providing for a continuous rotation of the burner. In this instance, the burner is rotatable in a non-rotating head 87. A bevel gear 88 fixed to the burner is driven by a pinion 89 on the shaft of a small electric motor 91 mounted on the bracket 49.

Although we have herein shown the fire finishing burner arranged to operate on bottles after they have been discharged from the forming machine, it will be understood that certain features of the invention have a much wider scope of utility. For example, it may sometimes be found desirable to use the burner for fire finishing the bottles while they are still held in the finishing molds of the blowing machine.

Various modifications may be resorted to within the spirit and scope of our invention.

What we claim is:

1. In fire finishing apparatus, the combination of a burner constructed to project an annular flame, means for bringing glass articles having circular open ends successively into operative relation to the burner and causing the annular flame to be projected against said open ends, and a pair of gripping jaws periodically operable to grip the articles while said flame is being projected against the open ends.

2. The combination of a horizontally traveling conveyor, a fire finishing apparatus comprising a burner arranged over the conveyor and having a downwardly projected nozzle, and means comprising a pair of gripping jaws periodically movable toward and from each other transversely of the conveyor for gripping and thereby arresting glass containers carried by said conveyor with their open upper ends beneath the nozzle, said nozzle constructed to direct an annular sheet of flame downwardly against the open ends of said articles.

3. The combination of a horizontally traveling conveyor, a fire finishing apparatus comprising a burner arranged over the conveyor and having a downwardly projected nozzle, means for arresting glass containers carried by said conveyor with their open upper ends beneath the nozzle, said nozzle constructed to direct an annular sheet of flame downwardly against the open ends of said articles, and means for moving the burner up and down periodically in synchronism with the movements of said articles to position beneath the burner.

4. In fire finishing apparatus, the combination of a burner constructed to project an annular flame, means for bringing glass articles having circular open ends successively into operative relation to the burner and causing the annular flame to be projected against said open ends, and valves automatically operable to reduce the flame periodically in timed relation to the movements of the articles into and out of operative relation to the burner.

5. The combination of a horizontally traveling conveyor, a fire finishing apparatus comprising a burner arranged over the conveyor and having a downwardly projected nozzle, means for arresting glass containers carried by said coneyor with their open upper ends beneath the nozzle, said nozzle constructed to direct an annular sheet of flame downwardly against the open ends of said articles, and automatic means to lower the nozzle and bring it into operative relation to the upper end of each said article as the latter is brought to a position beneath the burner.

6. The combination of a horizontally traveling conveyor, a fire finishing apparatus comprising a burner arranged over the conveyor and having a downwardly projected nozzle, means for arresting glass containers carried by said conveyor with their open upper ends beneath the nozzle, said nozzle constructed to direct an annular sheet of flame downwardly against the open ends of said articles, automatic means to lower the nozzle and bring it into operative relation to the upper end of each said article as the latter is brought to a position beneath the burner, and automatic means to reduce the flame while the burner is out of operative relation to said article.

7. In fire finishing apparatus, the combination of a burner constructed to project an annular flame, means for bringing glass articles having circular open ends successively into operative relation to the burner and causing the annular flame to be projected against said open ends, and automatic means to rotate the burner during said projection of the flame.

8. In fire finishing apparatus, the combination of a burner, means to periodically move the burner toward and from an operative position, and a series of individually adjustable stops periodically movable into operative position in succession to control the extent of said movements.

9. In fire finishing apparatus, the combination of a burner, means for moving a series of articles in succession to a fire finishing position, and a series of individually adjustable stops periodically movable into operative position in succession to control the operative position of the burner to correspond to different lengths or sizes of the said articles.

10. In fire finishing apparatus, the combination of a burner, means for bringing a series of articles to be fire finished beneath the burner with the surface to be finished at a predetermined distance from the burner, and automatic means including an annular series of individually adjustable stops movable in succession to an operative position to periodically adjust the position of the burner to correspond to predetermined variations in the height of said articles to thereby maintain said distance constant for all of said articles.

11. In fire finishing apparatus, the combination of a burner, means for moving a series of articles successively to fire finishing position opposite the burner, means to move the burner successively toward and from its operative position, and a series of stops brought successively into position to arrest the burner in its movement to operative position, said stops being of different lengths to thereby periodically vary the arrested position of the burner.

12. In fire finishing apparatus, the combination of a burner, means for moving a series of articles successively to fire finishing position opposite the burner, means to move the burner successively toward and from its operative position, and a series of stops brought successively into position to arrest the burner in its movement to operative position, said stops being individually adjustable to cause the burner to be arrested in different operative positions corresponding with periodic variations in the length of said articles.

13. In fire finishing apparatus, the combination of a burner having a downwardly directed nozzle, means to bring a series of articles periodically into fire finishing position beneath said nozzle, means to periodically move the burner up and down in timed relation to the movements of said articles, a stop wheel, a series of individually adjustable stops thereon, and means to impart a step-by-step rotation to said wheel in timed relation to said movements of the burner and thereby bring the stops successively into position to arrest the downward movements of the burner and thereby periodically vary the operative position of the burner to correspond to variations in the height of said articles.

14. The combination of a glass forming machine comprising an annular series of molds operable to successively discharge glass articles, a fire finishing burner, means to bring discharged articles successively into operative relation to the burner, and means to move the burner toward and from its operating position periodically at intervals equal to the intervals between the discharge of successive articles from the molds.

15. The combination of a glass forming machine comprising an annular series of molds operable to successively discharge glass articles, a fire finishing burner, means to bring discharged articles successively into operative relation to the burner, and selective means for automatically varying the operative position of the burner to correspond to variations in the length of said articles.

16. The combination of a glass forming machine comprising an annular series of molds operable to successively discharge glass articles, fire finishing apparatus comprising a burner, means for bringing the discharged articles successively into operative relation to the burner, means for moving the burner to and from an operative position at regular intervals corresponding to the intervals between the discharge of articles from the molds, a series of stops corresponding in number to the number of said molds, and means to move said stops successively into position to arrest the movement of the burner towards its operative position, said stops being individually adjustable to correspondingly adjust the stop position of the burner.

17. The combination of a horizontally traveling conveyor by which a series of articles are brought in succession to a fire finishing position, a pair of gripping jaws arranged to grip said articles successively and hold them in fire finishing position, automatic means to periodically actuate said jaws, and fire finishing means to operate on the articles when in said fire finishing position.

18. The combination of a horizontally traveling conveyor by which a series of articles are brought in succession to a fire finishing position, a pair of gripping jaws arranged to grip said articles successively and hold them in fire finishing position, automatic means to periodically actuate said jaws, means associated with said jaws operative while one article is held in fire finishing position, to arrest the next succeeding article and hold it in a predetermined position independently of the movement of the conveyor, and fire finishing means to operate on the articles when in said first finishing position.

19. The combination of a continuously traveling conveyor by which a series of articles are brought successively to a fire finishing position, a holding device operative to grip and individually hold an article in said fire finishing position, means to arrest the next succeeding article and hold it stationary in a predetermined position while the preceding article is in fire finishing position, and fire finishing means to operate on the articles when in said fire finishing position.

20. The combination of a continuously traveling horizontal conveyor, a stationary fire finishing burner over the conveyor, a pair of holding arms, automatic means to periodically move said arms toward each other to engage and hold one of said articles beneath the burner, and means controlled by said arms to arrest the next succeeding article in its advance toward said fire finishing position while the first article is held by said arms and to release said succeeding article when the arms are separated and permit it to advance to said fire finishing position.

21. The method of fire finishing a glass article which consists in successively arresting the movement of and temporarily separately holding glass articles carried on an endless conveyor at a station in their normal path of travel on said conveyor, and thereby disposing for an instant each article under fire finishing means in timed relation to the discharge of the said articles from a glass forming machine, and in momentarily directing against the surface of the article to be finished, a flame of sufficient intensity to melt the surface of the glass before the heat has penetrated the body of glass sufficiently to soften it and cause a deformation thereof.

22. The method of fire finishing the open end or lip of a hollow glass container which consists in successively arresting the movement of and temporarily separately holding glass articles carried on an endless conveyor at a station in their normal path of travel on said conveyor, and thereby disposing for an instant each article under fire finishing means in timed relation to the dicharge of the said articles from a glass forming machine, and in directing a localized flame against the lip of the container of sufficient intensity to liquefy the surface of the glass.

23. The method of fire finishing the open end or lip of a bottle which consists in successively arresting the movement of and temporarily separately holding glass articles carried on an endless conveyor at a station in their normal path of travel on said conveyor, and thereby disposing for an instant each article under fire finishing means in timed relation to the discharge of the said articles from a glass forming machine, and in directing an intensely hot annular flame against said lip.

24. The method of fire finishing the open end or lip of a bottle, which consists in successively arresting the movement of and temporarily holding glass articles carried on an endless conveyor, and thereby disposing for an instant a plurality thereof at a station in their normal path of travel on said conveyor, under fire finishing means in timed relation to the discharge of the said articles from a glass forming machine, and in directing an intensely hot annular flame against said lip, and simultaneously effecting a relative rotation of said flame and lip.

25. The method of fire finishing the surface of a glass article, which consists in successively arresting the movement of and temporarily holding glass articles carried on an endless conveyor, and thereby disposing for an instant each article under fire finishing means in timed relation to the discharge of the said articles from a glass forming machine, and in directing a localized oxy-acetylene flame against the surface to be fire finished, thereby melting the surface of the glass, and then withdrawing the flame.

26. The method of fire finishing the open end or lip of a bottle, which consists in successively arresting the movement of and temporarily separately holding glass articles while they are carried on an endless conveyor, and thereby disposing for an instant each article under fire finishing means in timed relation to the discharge of the said articles from a glass forming machine, in directing an annular series of minute jets of intensely hot flame against the lip of the bottle, and simultaneously effecting a relative rotation of the bottle and said series of jets and thereby producing, in effect, a ring of flame applied to said lip.

27. In fire finishing apparatus, a burner comprising a nozzle having an annular series of minute openings, means to supply a mixture of combustible gasses and cause them to issue through said openings, and cam actuated valves for periodically reducing the supply of gas to the burner.

28. In fire finishing apparatus, a burner comprising a nozzle having an annular series of minute openings, means to supply a mixture of combustible gases and cause them to issue through said openings, cam actuated valves for periodically varying the supply of gases to the openings, and means for periodically moving the burner to and from a position in operative relation to articles to be fire finished.

29. In fire finishing apparatus, a burner comprising a nozzle having an annular series of minute openings, means to supply a mixture of combustible gases and cause them to issue through said openings, means for periodically moving the burner to and from a position in operative relation to articles to be fire finished, and cam actuated valves for periodically cutting down the supply of fuel gas to the burner in synchronism with its said movements.

30. In fire finishing apparatus, the combination of means for bringing glass containers successively to a fire finishing position, automatic means for projecting an annular fire finishing flame against the open ends of the containers while in said position, and means spacing the containers from each other.

31. The combination of means for moving a series of bottles or other glass containers having open ends, to a fire finishing position, means to direct an annular fire finishing flame against said open ends while in said position, and means spacing the containers from each other.

32. A burner having an opening arranged to direct an annular flame against the rim of the open end of a container, and means to rotate the burner about an axis concentric with said rim and thereby cause the flame to travel along the rim.

33. The combination of a horizontally traveling conveyor, means to deliver articles at predetermined intervals to the conveyor, a fire finishing burner beneath which the articles are brought in succession by the movement of the conveyor, and means including article gripping jaws to arrest each article beneath the burner.

34. The combination of a horizontally traveling conveyor, means to deliver articles at predetermined intervals to the conveyor, a fire finishing burner beneath which the articles are brought in succession by the movement of the conveyor, means to arrest each article beneath the burner, and actuating means operating in timed relation to the delivery of the articles to the conveyor to control the operations of said arresting means.

35. The combination of a traveling conveyor, a machine for delivering articles at regular intervals to the conveyor, a fire finishing burner, means for causing a step-by-step advance of the bottles to a position beneath the burner, said step-by-step advance being in timed relation to the delivery of the articles from said machine to the conveyor.

Signed at Evansville, in the county of Vanderburg and State of Indiana, this 20th day of March, 1924.

JOHN MURL LENTS.
FRANK R. MILLER.